No. 748,622. PATENTED JAN. 5, 1904.
H. KLEINFELDT.
CLOTHES LINE FASTENER.
APPLICATION FILED OCT. 7, 1903.
NO MODEL.

Witnesses:
Frederick Unfricht
William Schulz

Inventor:
Hermann Kleinfeldt
by Hauff & Friese Atty.

No. 748,622. Patented January 5, 1904.

UNITED STATES PATENT OFFICE.

HERMANN KLEINFELDT, OF NEW YORK, N. Y.

CLOTHES-LINE FASTENER.

SPECIFICATION forming part of Letters Patent No. 748,622, dated January 5, 1904.

Application filed October 7, 1903. Serial No. 176,057. (No model.)

*To all whom it may concern:*

Be it known that I, HERMANN KLEINFELDT, a citizen of the United States, residing at New York city, (Manhattan,) county and State of New York, have invented new and useful Improvements in Clothes-Line Fasteners, of which the following is a specification.

This invention relates to a clothes-line fastener made of a single piece of bent wire and adapted to connect the ends of the line in a reliable manner.

Figure 1:
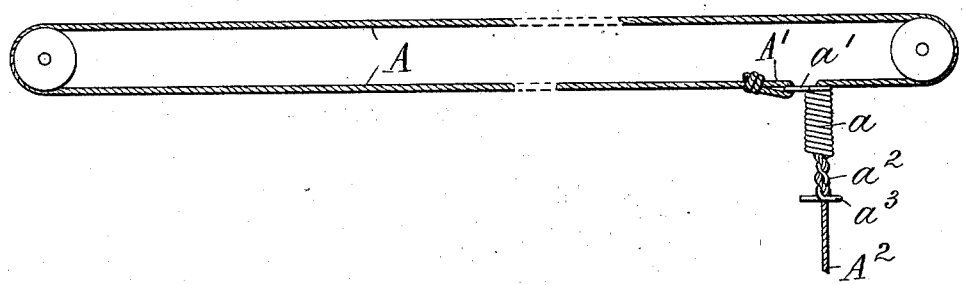
Figure 1:
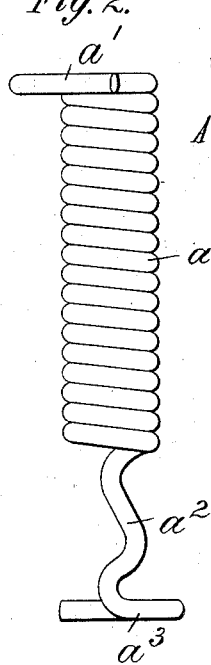
Figure 1:
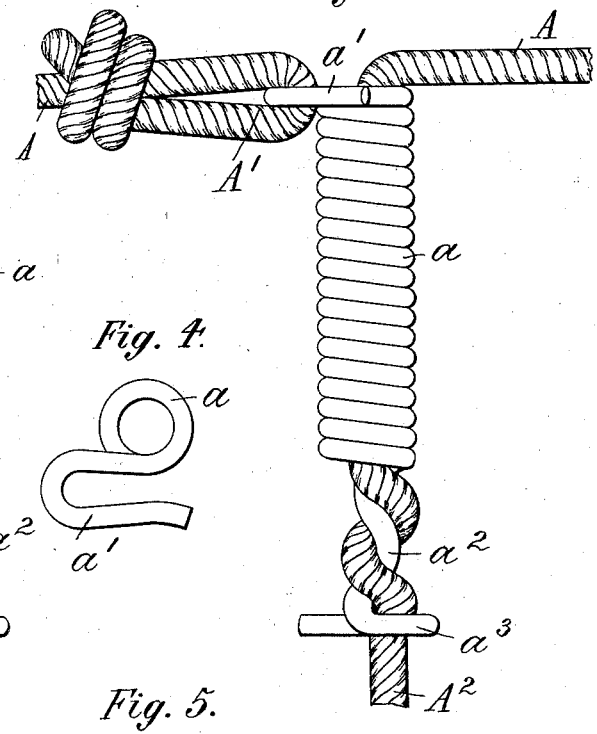
Figure 1:
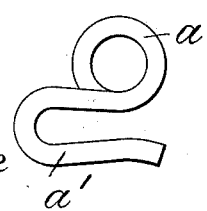
Figure 1:

In the accompanying drawings, Figure 1 is a diagram showing my improved clothes-line fastener in use; Fig. 2, a side view of the clothes-line fastener; Fig. 3, a similar view of the fastener with the rope attached; Fig. 4, a plan, and Fig. 5 a bottom, view of the fastener.

The fastener is made in one piece and is composed of a tubular coil $a$ of resilient wire. The upper end of the coil is bent sidewise to form an upper hook $a'$. The lower end of the coil is bent first downward to form a shank $a^2$ and then sidewise to form a second hook $a^3$. The shank $a^2$ is made of sinuous form, so as to better interlock with the line. Thus the shank $a^2$ constitutes a secondary coil, which forms a continuation of the main coil $a$, but has convolutions of less diameter and greater pitch than those of the main coil.

In use one end of the line, A, is formed into an eye $A'$, which is engaged by the upper hook $a'$. The other end, $A^2$, of the line is passed through the coil $a$, laid around the sinuous shank $a^2$, and then slipped into engagement with the lower hook $a^3$. In this way both ends of the line are securely connected. If it is desired to slacken or tighten the line, its end $A^2$ is disengaged from hook $a^3$ and shank $a^2$ and the line is drawn through the coil $a$ until the proper readjustment has been effected, after which the line is again interlocked with the shank and hook.

It will be seen that my improved fastener is of simple construction, may be readily manipulated, and that it reliably connects the ends of the line.

What I claim is—

A clothes-line fastener, composed of a wire forming a main coil, a secondary coil of less diameter and greater pitch than the main coil, a hook at the end of the main coil, and a second hook at the end of the secondary coil, substantially as specified.

Signed by me at New York city, (Manhattan,) New York, this 6th day of October, 1903.

HERMANN KLEINFELDT.

Witnesses:
FRANK V. BRIESEN,
ALBERT JACOBI.